June 29, 1926. 1,590,840
J. LUNDGREN
CONTINUOUS STATIC DYNAMIC BALANCE TESTING MACHINE
Filed April 26, 1921 2 Sheets-Sheet 1
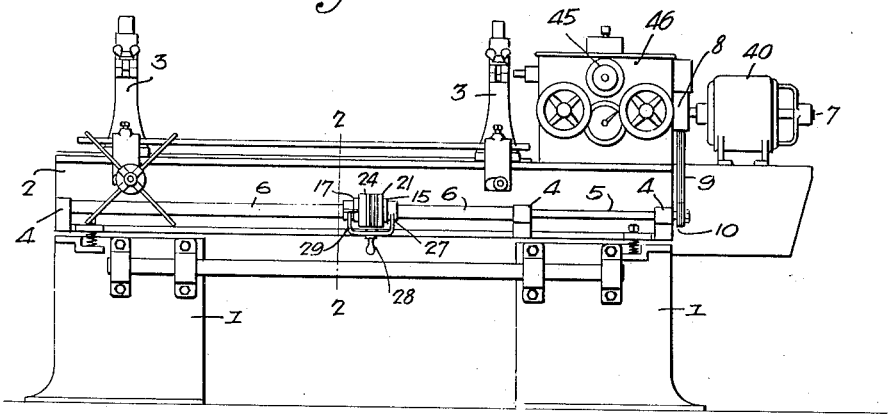
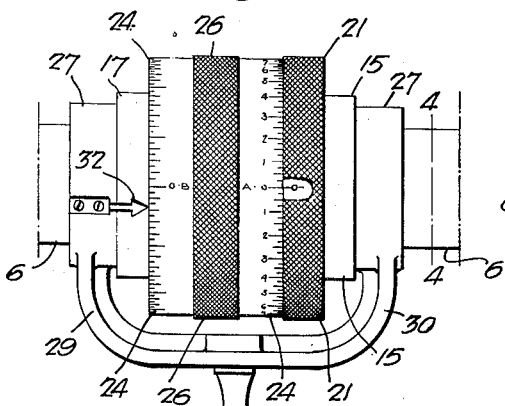
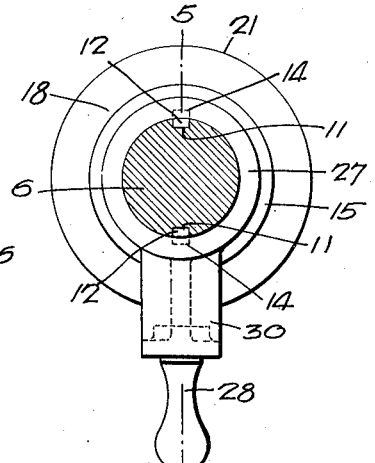
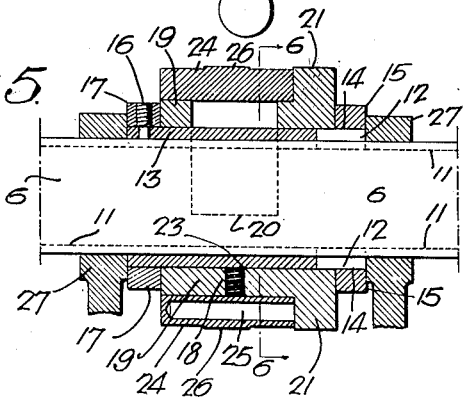
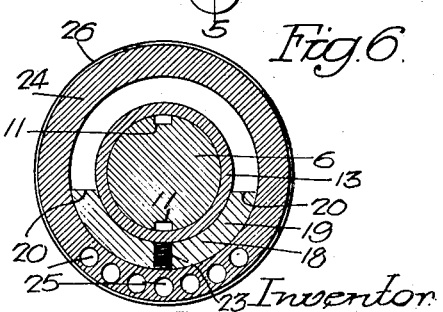
Inventor
Jacob Lundgren.
by his Attorneys June 29, 1926.

J. LUNDGREN 1,590,840

CONTINUOUS STATIC DYNAMIC BALANCE TESTING MACHINE

Filed April 26, 1921     2 Sheets-Sheet 2

Inventor.-
Jacob Lundgren.
by his Attorneys-
Huron & Huron.

Patented June 29, 1926.

1,590,840

UNITED STATES PATENT OFFICE.

JACOB LUNDGREN, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

CONTINUOUS STATIC DYNAMIC BALANCE-TESTING MACHINE.

Application filed April 26, 1921. Serial No. 464,600.

My invention relates to improvements in balancing machines, and more particularly in that type of machine shown and described in my co-pending applications, Serial Numbers 219,066, 238,138, and 238,139, and employed for the purpose of determining and locating both static and dynamic unbalance in rotating bodies.

One object of my present invention is to provide means for accurately locating the point longitudinally of the axis of rotation of a body at which the necessary correction is to be made either in material added or removed from the body to eliminate the static unbalance.

Another object is to provide means for correcting the static unbalance by creating in the machine an exact static counter unbalance whereby the body may be tested for dynamic unbalance when such unbalance exists prior to the actual correction therein for the previously determined static unbalance, both the static and dynamic correction being made in one operation.

In the attached drawings:—

Figure 1 is a front elevation of a testing machine made in accordance with my invention;

Fig. 3 is a fragmentary front view of the static counterbalancing device including a portion of shaft upon which it is mounted;

Fig. 4 is a section on the line 4—4, Fig. 3;

Fig. 5 is a section on the line 5—5, Fig. 4;

Fig. 6 is a section on the line 6—6, Fig. 5;

Figure 2:
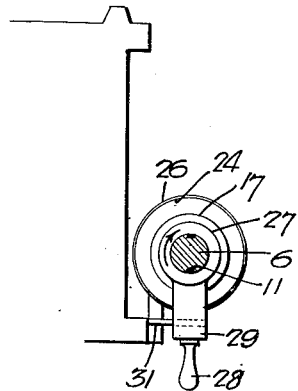
Fig. 2 is a fragmentary section of the machine on the line 2—2, Fig. 1.

With reference to the drawings, the machine comprises the usual base or pedestals 1, upon which is adjustably supported a bed 2 adapted to carry in suitable bearings 3, 3, provided for the purpose, a body under test, the said body being rotated by suitable motive means such as an electric motor 40. The machine is, in all essential respects of construction and operation, similar to those forming the subject of my above mentioned pending applications.

Mounted in suitable bearings 4, 4, extending in the present instance forwardly from the side of the bed 2 is a shaft 5 so disposed as to lie parallel to the axis of rotation of a body mounted in the said bearings 3. I have shown in the present instance a portion 6 of the shaft 5 of increased diameter, said enlarged portion being confined between the intermediate and one of the end bearings 4, whereby movement of the shaft in an axial direction is prevented. Carried in the present instance by the armature shaft 7 is a sprocket 8 which is connected by means of a suitable sprocket chain 9 to a sprocket 10 mounted upon the shaft 5, in alignment with the sprocket 8, the ratio of said sprockets being such that the shaft 5 is rotated at the same rate of speed as the body under test.

The portion 6 of the shaft 5 has extending longitudinally thereof keyways 11, 11, and splined to the shaft by means of the said keyways and keys 12, 12, which fit in recesses 14 at one end thereof is a sleeve 13, said sleeve having at the recessed end thereof an integral collar 15, and having detachably secured to the other end, as by means of set screws 16, a second collar 17.

Figure 8:
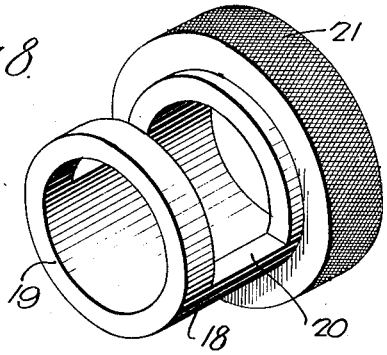
Figs. 8 and 9 are detached perspectives of elements of the device.
Figure 9:
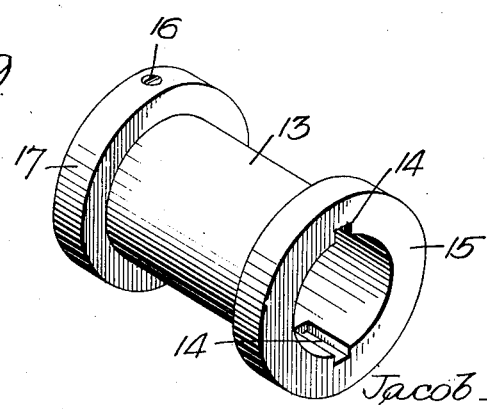

Mounted upon the sleeve 13 and confined between the collars 15 and 17 is a cylindrical element 18, shown detached and in perspective in Fig. 8, said element consisting of a body portion 19 having a portion thereof at one side removed as indicated at 20 to create a static unbalance with respect to the axis of rotation, and having a flange 21 at one end, the periphery of which is knurled to provide a hold for the fingers in rotating the element upon the sleeve. A radial aperture is provided in the body 19 in which is established a tension spring 23 adapted to bear against the periphery of the sleeve 13 and the inner periphery of a ring-shaped element 24, which latter is mounted upon the body portion 19 of the element 18 and has extending inwardly from one side a series of recesses 25, said recesses creating in the element a static unbalance with respect to the axis of rotation which, when the recesses are disposed diametrically opposite the opening 20 in the element 18, exactly counteracts the static unbalance existing, as heretofore explained, in the said latter element. A circumferential elevation 26 intermediate the sides of the element 24 having the periphery thereof knurled provides a grip for the fingers in rotating the element relative to the element 18. The spring 23 tends to retain the elements relatively immovable.

A forked member 27 comprising a suitable handle 28, has its arms 29 and 30 disposed at opposite sides of the sleeve 13 with openings in said arms for passage therethrough of the shaft 6, said member depending from the shaft and providing means for shifting the sleeve with its associated parts longitudinally of the shaft. As shown in Fig. 2, an arm 31 is provided upon the member 27, the end of which is adapted to bear against the side of the bed 2, and since the shaft 5 is adapted to rotate outwardly from the bed at the top, as indicated by the arrow in the drawings, the said member 27 is retained by reason of the said rotation and of the arm 31 normally in a predetermined position circumferentially of the shaft. A pointer 32 is fixed to the arm 29 of the member 27, opposite the outer edge of the element 24, the function of which pointer will be described hereinafter.

Figure 7:
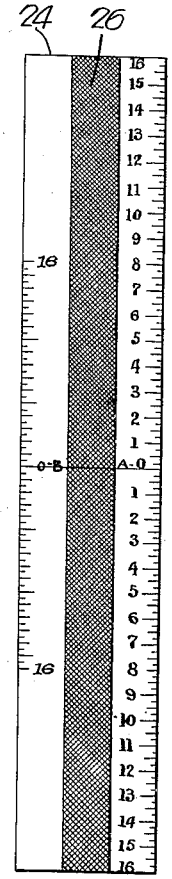
Fig. 7 is a development of an element of the device.

From the above description, it will be seen that by shifting the element 24 circumferentially of the element 18, any degree of static unbalance from zero to maximum limit may be obtained in the device, and means is provided for setting the device in any desired amount of unbalance, said means consisting of graduations or markings upon the periphery of the element 24 opposite the inner edge thereof, as shown in Figs. 3 and 7, said markings corresponding to the readings obtained upon the static dial of the machine itself, so that any amount of static unbalance recorded on the dial of the machine may be set up in equivalent amount in the device. Means is also provided for bringing the plane of static unbalance in the device into a predetermined position relative to the plane of static unbalance of the test object when the machine is stopped on the static indicating line, this means comprising the pointer 32 and suitable graduations upon the element 24 opposite the outer edge thereof, also as indicated in Figs. 3 and 7.

In operation, the procedure is as follows: With the test object properly mounted in the machine, the static attachment is set in the manner described for zero unbalance, the zero mark on the periphery of the flange 21 being brought opposite the zero indication at the inner edge of the element 24. The test body is then tested in the usual manner for static unbalance and the machine stopped on the static indicating line on the drum dial 45 at the top of the headstock 46. The element 24 is then turned upon the element 18, in either direction, depending upon whether the correction to the body is to be made by adding or subtracting material, until the graduation upon the element 24 corresponding to the reading of the static unbalance lies opposite the zero marking on the flange 21, thereby effecting in the attachment an unbalance equal to that in the test body. The element 18 is then turned on the sleeve until the graduation at the outer edge of the sleeve corresponding to the reading of the static unbalance lies opposite the pointer 32 whereby the unbalance in the attachment is disposed to exactly counteract the unbalance in the test body.

The machine is now changed over to the dynamic supports and, with the motor in operation, the attachment is shifted longitudinally of the shaft 5 until vibration of the bed either ceases entirely or is reduced to a minimum. If all vibration is eliminated, it indicates the absence in the body of dynamic unbalance; if vibration persists, after reduction to a minimum, the test for dynamic unbalance is made in the usual manner. In either case, the position of the attachment indicates accurately the point in the test body longitudinally of the axis of rotation at which the minimum amount of alteration will correct the static unbalance of the body.

It will be understood that I do not wish to limit myself to any particular disposition on the machine of the elements involved in the invention, and that considerable modification is possible without departure from the essential features of the invention.

I claim:—

1. In a balance testing machine, the combination with an oscillatory support structure, of means for rotatably mounting a body upon the said structure, means for rotating the body, means for creating an unbalance in the structure to counteract the unbalance in said body, and auxiliary means associated with the support and operable independently of said unbalancing means for counteracting the effect upon said support of static unbalance existing in the rotating body.

2. In a balance testing machine, the combination with an oscillatory support structure, of means for rotatably mounting a body upon the said structure, means for creating an unbalance in the structure to counteract the unbalance in said body, a rotatable member carried by said structure, means for creating in said member a condition of static unbalance corresponding to the static unbalance existing in said body, and mechanism for rotating the body and said member synchronously, said rotatable member being movable axially of said rotatable body.

3. In a balance testing machine, the combination with an oscillatory support structure, of means for rotatably mounting a body upon said structure, means for creating an unbalance in the structure, a shaft rotatably mounted upon said structure, a member rotatable with said shaft and movable longitudinally thereof, means for creating in said member a condition of static unbalance to counteract the effect upon the said support structure of static unbalance existing in said rotating body, and mechanism for synchronously rotating said body and shaft.

4. In a balancing machine, the combination with an oscillatory support structure, of means for rotatably mounting a body upon the said structure, means for creating an unbalance in the structure to counteract the unbalance in said body, a shaft rotatably mounted upon said structure paralleling the axis of said body, a member rotatable with the shaft and having means for creating therein a state of static unbalance corresponding to the static unbalance in the body, and mechanism for rotating the body and the shaft.

5. In a balancing machine, the combination with an oscillatory support structure, of means for rotatably mounting a body upon the said structure, means for creating an unbalance in the structure to counteract the unbalance in the said body, a rotatable member carried by said structure, mechanism for rotating said body and said member, means for creating in said member a condition of static unbalance corresponding to the static unbalance in the body, and means for so disposing the plane of static unbalance in said member that the unbalance therein counteracts the effect upon said structure of the unbalance in said body.

6. In a balance testing machine, the combination with an oscillatory support structure, of means for rotatably mounting a body upon said structure, means for creating an unbalance in the structure to counteract the unbalance in said body, a shaft rotatably mounted upon said structure and paralleling the axis of rotation of said body, mechanism for rotating said body and the shaft synchronously, a member rotatable with said shaft but free to move longitudinally thereof, means for creating in said member a condition of static unbalance corresponding to the static unbalance in the body, and means for so disposing the plane of unbalance in said member as to counteract the effect upon the said structure of the static unbalance in the body.

7. In a balance testing machine, the combination with a support structure oscillatory around two different axes perpendicularly disposed with respect to each other, of means for rotatably mounting a body upon said structure with its axis of rotation parallel to one of the said axes of oscillation, mechanism for rotating said body, means for suppressing the oscillation of the structure around each of said axes of oscillation while leaving the structure free to oscillate around the other of said axes, a shaft rotatably mounted on said structure, a member rotatable with the shaft and movable longitudinally thereof, means for creating in said member a condition of static unbalance, said shaft being so disposed upon the structure that the effect of the unbalance in said member upon the structure when the latter is supported upon one of its axes of oscillation is constant regardless of the position of said member longitudinally of the shaft, while the effect of the unbalance in said member upon the structure when the latter is supported upon its other axis of oscillation is varied by differing positions of said member upon the shaft.

8. In a balance testing machine, the combination with a support structure oscillatory around two different axes perpendicularly disposed with respect to each other, of means for rotatably mounting a body upon said structure with its axis of rotation parallel to one of the said axes of oscillation, means for suppressing the oscillation of the structure around each of said axes of oscillation while leaving the structure free to oscillate around the other of said axes, a shaft rotatably mounted upon said structure parallel to one of said axes of oscillation, a member rotatable with said shaft and movable longitudinally thereof, means for creating in said member a condition of static unbalance to neutralize the effect upon the support structure of static unbalance existing in the body, and means for rotating said body and shaft.

9. In a balance testing machine, the combination with an oscillatory support structure, of means for rotatably mounting a body upon the said structure, means for creating an unbalance in the structure to counteract the unbalance in said body, a device rotatably mounted upon said structure and comprising a pair of relatively movable and statically unbalanced elements adapted in one of their relative positions to counteract in each other the said unbalance and adjustable to different relative positions giving different degrees of static unbalance in the device, and means for rotating the body and the device, substantially as and for the purpose set forth.

10. In a balance testing machine, the combination with a support structure oscillatory around two different axes perpendicularly disposed with respect to each other, of means for rotatably mounting a body upon said structure with its axis of rotation parallel to one of said axes of oscillation, mechanism for rotating said body, means for suppressing the oscillation of the structure around each of said axes of oscillation while leaving the structure free to oscillate around the other of said axes, and independent means both operatively associated with said support structure for counteracting the effect thereon of static unbalance existing in said rotating body for both axes of oscillation, said independent means being movable to vary the plane of static unbalance thereof.

11. In a balance testing machine, the combination with a support structure oscillatory around two different axes perpendicularly disposed with respect to each other, of means for rotatably mounting a body upon the said structure with its axis of rotation parallel to one of said axes of oscillation, mechanism for rotating said body, means for suppressing the oscillation of the structure around each of said axes of oscillation while leaving the structure free to oscillate around the other of said axes, a member operatively associated with the support structure having means for creating therein a condition of static unbalance capable of counteracting the effect upon the supporting structure of static unbalance existing in the rotating body, and means for varying the distance between one of said axes of oscillation and said member while retaining constant the distance between said member and the other axis of oscillation whereby the effect of the unbalance in said member upon the support structure may be altered until it counteracts the effect upon the said structure of the static unbalance existing in the rotating body regardless of the axis of oscillation of said structure.

12. In a balance testing machine, the combination with a support structure oscillatory around two different axes perpendicularly disposed with respect to each other, of means for rotatably mounting a body upon the said structure with its axis of rotation parallel to one of said axes of oscillation, means for suppressing the oscillation of the structure around each of the said axes of oscillation while leaving the structure free to oscillate around the other of said axes, means operatively associated with said support for counteracting the effect thereon of unbalance existing in said body for both axes of oscillation, a member carried by said structure and movable on said structure in a direction parallel to one of the said axes of oscillation, and means for creating in said member a condition of static unbalance corresponding to the static unbalance existing in the said rotating body, and means for synchronously rotating the body and said member.

13. In a balance testing machine, the combination with a support structure oscillatory around two different axes perpendicularly disposed with respect to each other, of means for rotatably mounting a body upon the said structure with its axis of rotation parallel to one of its axes of oscillation, means for suppressing the oscillation of the structure around each of said axes of oscillation while leaving the structure free to oscillate around the other of said axes, means operatively associated with said support for counteracting the effect upon the support structure of unbalance existing in said body for each axis of oscillation, a shaft mounted upon said structure parallel to the axis of rotation of said body, a member rotatable with said shaft and movable longitudinally thereof, means for creating in said member a condition of static unbalance corresponding to the static unbalance existing in said body, and means for synchronously rotating said body and shaft.

14. The method of testing the balance of a body, which consists of rotating said body in a structure free to oscillate on an axis parallel to the axis of rotation of said body, counteracting the effect upon the said structure of static unbalance in said body by rotating in the structure a unit having the same degree of static unbalance as the said body, changing the axis of oscillation of said structure to lie perpendicular to said first axis, and adjusting the unit to vary the effect thereof upon the structure until oscillation of the structure about the new axis is eliminated or reduced to a minimum.

15. The method of testing the balance of a body, which consists of rotating said body in a structure free to oscillate on an axis parallel to the axis of rotation of said body, neutralizing the effect upon said structure of static unbalance existing in said body by rotating in the structure a unit having the same degree of static unbalance as the said body, changing the axis of oscillation of said structure to lie perpendicular to said first axis, and shifting the said unit upon the structure relative to the said second axis until oscillation about the latter is eliminated or reduced to a minimum.

16. In a balance testing machine, the combination with mechanism for determining dynamic unbalance in a test specimen, of means operatively associated with said mechanism for counteracting the effect thereon of static unbalance existing in the specimen, said means being mounted on an axis external to the axis of said specimen.

17. In a balance testing machine, the combination with an oscillatory structure adapted to rotatably support a body with its axis of rotation perpendicular to the axis of oscillation of the structure, means for counteracting the effect upon the structure of dynamic unbalance in the specimen, and separate means for counteracting the effect upon the structure of static unbalance in the specimen, said means being mounted on an axis external to the axis of said rotating body.

18. In a balance testing machine, the combination with an oscillatory support structure of means for rotatably mounting a body upon the said structure, and a plurality of independent means for creating an unbalance in the structure to counteract the unbalance in the body, one of said independent means being mounted on an axis externally of said rotatable body.

19. In a balance testing machine, the combination with a support structure oscillatory around two different axes, of means for rotatably mounting a body upon the said structure, common mechanism for creating an unbalance in the structure to counteract the unbalance in the body for both axes of oscillation of the structure, and independent mechanism for creating an unbalance in the structure to counteract the unbalance of the body for one of said axes of oscillation of the structure, said independent mechanism being movable longitudinally of one of said axes.

20. A balance testing machine comprising an oscillatory structure affording a rotative support for a body to be balanced, means for creating an unbalance in said structure to counteract the unbalance in said body, and auxiliary means associated with said structure for indicating the plane as well as the angular position in said plane at which material must be added to or removed from said body to effect the static and dynamic balancing thereof.

JACOB LUNDGREN.